United States Patent

Brown

[15] 3,683,693

[45] Aug. 15, 1972

[54] UNIVERSAL PROPORTIONAL DIFFERENTIAL PRESSURE PRODUCING FLUID FLOW DEVICE

[72] Inventor: William R. Brown, 341 W. Mt. Vernon St., Lansdale, Pa. 19446

[22] Filed: Oct. 8, 1970

[21] Appl. No.: 79,246

Related U.S. Application Data

[63] Continuation-in-part of Ser. No. 882,405, Dec. 17, 1969, Pat. No. 3,590,637.

[52] U.S. Cl. .................................................73/212
[51] Int. Cl. .................................................G01p 5/16
[58] Field of Search........................73/205, 212, 213

[56] References Cited

UNITED STATES PATENTS

| | | | |
|---|---|---|---|
| 2,260,019 | 10/1941 | Gentile | 73/212 |
| 3,355,946 | 12/1967 | Lazell | 73/212 |
| 3,083,568 | 4/1963 | Soredal | 73/212 |
| 3,349,615 | 10/1967 | Finkl | 73/212 |

OTHER PUBLICATIONS

I. T and T Bulletin 6691–5 1966

Primary Examiner—Richard C. Queisser
Assistant Examiner—Herbert Goldstein
Attorney—Paul & Paul

[57] ABSTRACT

In the conduit of a fluid and/or gas flow system at least one fin extends inwardly from the wall of the conduit to produce a selected predetermined Beta ratio and differential pressure. The configuration of the fin can be changed by numerous methods to produce the desired Beta ratio, differential pressure and overall performance characteristics.

8 Claims, 5 Drawing Figures

Patented Aug. 15, 1972

3,683,693

INVENTOR.
William R. Brown
BY
Paul & Paul
ATTORNEYS.

3,683,693

UNIVERSAL PROPORTIONAL DIFFERENTIAL PRESSURE PRODUCING FLUID FLOW DEVICE

CROSS-REFERENCE TO RELATED APPLICATION

This application is a continuation-in-part of my copending application Ser. No. 882,405 filed Dec. 17, 1969, now Pat. No. 3,590,637, issued July 6, 1971.

BACKGROUND OF THE INVENTION

This invention relates to fluid and gas flow measuring devices and, in particular, to devices which produce a differential pressure, in relation to the Beta ratio, and flow rate to actuate secondary instrumentation of various types.

Prior art flow metering devices for use in the measurement of media referenced include completely annular venturi tubes and orifice plates as primary measuring devices plus various types of primary measuring devices known as "proportional" meters. The primary measuring devices restrict total flow and exhibit relatively high head losses and numerous other detrimental characteristics as noted in my prior copending application. The so-termed proportional devices ostensibly measure only a portion of the total flow. However, the term "proportional" as heretofore applied to fluid meters had no relation to the type of primary device and any flow meter which was inserted in a branch of the main fluid flow system, presumably to cause a definite fraction of the total flow to pass through the branch containing the meter, has been heretofore termed a proportional meter. The numerous shortcomings of these types of meters have been noted in the prior art and in the A.S.M.E. publication entitled "Fluid Meters, Their Theory and Application," Copyright 1959.

Prior art devices which are not annular constrictions, such as pitot tubes, are designed to sense pressures at specific points in the flow path, and are not capable of producing a varied selection of desired Beta ratio values and differential pressure outputs. Further, these devices must be individually calibrated and also require "tailoring" of the secondary instrumentation to effect the necessary correlation with these devices. These processes are very costly and time consuming. These latter points not only refer to pitot tubes, but to numerous types of Venturi and modified Venturi configurations and the final correlations between calibrations must be accomplished on the job site or with extremely expensive scale models in test loops simulating actual operating conditions.

Other segmental type meters utilize forms having profiles of Venturis and nozzles or trapezoidal type forms which cannot produce the magnitude of differential, stability and the desired correlation of mean velocities both at the high and low pressure sensing taps, as my invention does. These devices are all subject to much greater drag forces and are not benefited by the exchange of momentum with the main flow.

SUMMARY OF THE INVENTION

My invention provides a means for accurately measuring a selected fraction of the total flow, which means is inserted into the main flow path or conduit thereby eliminating the need for conduit branch lines and shunts and auxiliary meters. It can also be used directly with sight indicating meters, such as a Rotameter, without the need for by-pass pressure lines taken from a Venturi or orifice, which are equipped with very small diameter orifices to reduce the differential pressures so that they can be utilized to actuate very small floats which, in turn, move vertically in relation to the greatly reduced differentials and indicate flow rate in accordance with their position in relation to graduated scales on these units. My invention is truly a universal flow meter and can replace Venturis, nozzles, flow tubes, orifice plates and many known types of differential producing primary measuring devices used to actuate many known types of secondary instrumentation.

In accordance with the present invention it is possible to select the Beta ratio, differential pressure output and functional characteristics for a given pipe size and flow rate by means of an extremely flexible differential pressure producing device providing a low head loss and better performance characteristics than devices known in the prior art. It comprises at least one and preferably a plurality of fins disposed generally radially inwardly from the inner wall of a conduit in a fluid flow system, each of which fins has a transverse area representing a restriction or obstruction in the conduit. This transverse area, the exact configuration of the fins and Beta ratio, can be accurately predetermined before insertion of the fin into the conduit to produce very predictable and highly accurate results. My device is universal, providing numerous means for selectively predetermining the Beta ratio, the differential pressure output and its overall performance characteristic. For example: by providing a surface on the fins preferably planar and defined by sharp edges, which surface slopes downstream from the wall of conduit to the innermost end thereof and positioning a high pressure sensing tap in said surface, I can selectively predetermine the differential pressure producing output of the device by selecting the angle which the upstream sloping surface makes with the inner wall of the conduit.

Further, I can vary the height and/or width (referred to in my application Ser. No. 822,405 as "length aspect") to increase or decrease the Beta ratio and differential. The angle of the inclined upstream surface of the fin can also be changed to provide the amount of rectification of flow conditions affecting the velocity profile as desired or required.

Further, depending on (a) the orientation of the fin, (b) which type fin is used and (c) the location of high and low pressure taps, my device can measure the differential between two (high and low) static pressures, it can measure the differential between a dynamic high pressure and a static low pressure and it can measure the differential produced between a dynamic high pressure and a dynamic low pressure. In addition, all fins shown can be used to measure flow in either direction and pressures sensed can be manifolded by several methods to obtain the averages of the pressures sensed.

The term "effective Beta ratio" as used herein directly correlates to the generally accepted definition of Beta ratio as that term is used in constricted fluid flow differential pressure producing devices having completely annular constrictions or throat sections such as, orifice plates, flow nozzles, venturis and flow tubes, etc. The mathematical value of the effective Beta ratio as defined and expressed herein is used to determine coefficient values, differentials and flow rates in the same manner and with the same equations as now applied to the term Beta ratio when used with reference to the aforementioned devices. This ratio can be expressed in terms of diameters, where "$d$" represents the effective throat diameter and "$D$" represents the diameter of the conduit.

$$\text{Effective beta ratio} = \frac{d}{D} = \frac{\text{effective throat area}}{\text{area of conduit}}$$

In other words, the ratio of the area of the main or inside diameter of the pipe (designated as $Ap$) to $Ap$ minus the total frontal area of the fins ($Af$) which is designated at $At$, or throat area, is the effective Beta ratio of this invention.
$Ap =$ Area of I.D. of pipe in sq. ft.
$Af =$ Total frontal area of fins.
e.g., 4 fins (5/16 thick × ¾ high)
$At = Ap - Af =$ Area of throat (sq. ft.)
Therefore, it follows that the effective Beta ratio is expressed as:

$$B = \frac{At \text{ (throat)}}{Ap \text{ (main)}} = \frac{D}{d}$$

Areas are, of course, converted to corresponding diameters in the conventional manner and as indicated, the division of the throat diameter by the main diameter establishes the Beta ratio.

Accordingly, it is an object of this invention to provide a unique and universal type of differential pressure producing device which will produce a differential pressure in direct proportion to the reduction of pipe area caused by the insertion of one or more fins into the pipe.

It is a further object to produce such a device which has an extremely low head loss, an increased flow capacity for a given pipe size and flow rate and will accurately measure an exact portion of fluid flow and provide a predictable differential pressure over an extremely wide range of flow rates.

These and other objects of this invention will become apparent from the following description with reference to the accompanying drawings.

DESCRIPTION OF THE PREFERRED EMBODIMENTS

Figure 1:
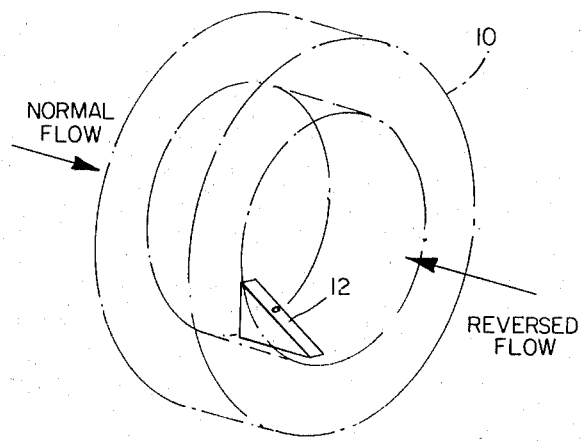
FIG. 1 is a perspective view of a device in accordance with one embodiment of my invention.

Although specific forms of the invention have been selected for illustration in the drawings, and the following description is drawn in specific terms for the purpose of describing these forms of the invention, this description is not intended to limit the scope of the invention which is defined in the appended claims.

Referring to the figures, in FIG. 1 a conduit or cylindrical ring section for mounting between flanges in a conduit, is illustrated in phantom lines to show the basic environment in which the fins in accordance with my invention are disposed. The conduit has a generally uniform unobstructed inner surface, preferably cylindrical, and fluid can be made to flow therein and measured in either direction of flow as shown by the arrows. One or more fins are disposed in the conduit or ring 10 as for example, the fin 12.

Figure 2:
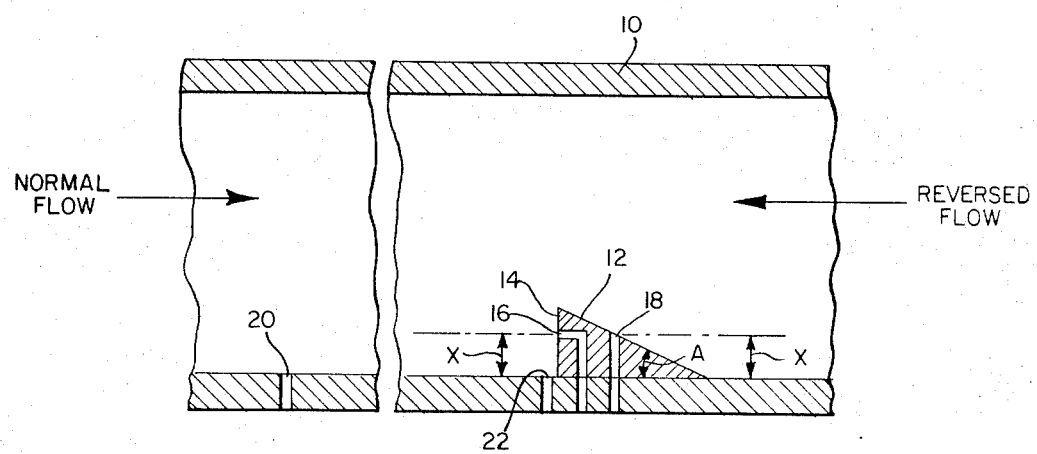
FIG. 2 is a vertical central section taken through the device shown in FIG. 1.

It is necessary to manufacture the fins accurately. Their corners and edges should be sharp and free from burrs and their sides should be parallel. This accuracy is necessary to be able to calculate the effective Beta ratio and coefficient value for a given device and to predict its differential pressure producing output. Various types of fins and their method of disposition in the conduits and rings have been described in my prior copending application and that description is incorporated herein by reference. The fin in accordance with the present invention can have one or more sensing taps therein communicating with passages through the wall of the conduit. For example, in one embodiment of this invention as shown in FIG. 2, a plurality of taps are provided in a single fin. The fin is blunt in that it has a vertical upstream surface extending from the inner wall of the conduit towards the center preferably perpendicularly, so that it is impinged upon by the fluid flowing through the conduit. The fin has a generally triangular profile and the long leg of the fin extends axially down the conduit along the wall thereof. The hypotenuse extends from the inner wall of the conduit back upstream to its innermost end. The surfaces along the hypotenuse, short leg, and triangular sides are planar and those along the hypotenuse and short leg are substantially rectangular.

A high pressure sensing tap is disposed in the vertical face 14 of the fin most preferably at the standard distance "$X$" from the inner wall of the conduit, which distance can be calculated and represents the theoretical point of mean velocity. This tap 16 senses the velocity head plus the static pressure.

A low pressure tap 18 is located in the sloping hypotenuse surface preferably at the same standard distance "$X$" as the high pressure tap. It senses the lower pressure in a somewhat dynamic manner because of the abrupt change in boundary layer caused by the blunt vertical surface 14 which creates a centrifugal force and flow path in this localized area which tends to cause intermixing with the main flow and results in a momentum exchange which actually increases the velocity and reduces viscous and pressure drag forces. The result is a correspondingly lower suction pressure and a much higher resultant differential pressure than is produced by taps in the wall of a cylindrical section (such as a pipe or the throat of a Venturi), even if the pressure is sensed by such taps downstream and in the wake of a form and regardless of whether the taps are located in the wall or in the vertical surface facing downstream. This also applies to low pressure taps in segmental or fin type forms. This also applies to low pressure taps opening in curved profiles and to low pressure taps opening in relatively flat surfaces of fins which are parallel to the horizontal axis of the main flow.

Of course, the high and low pressure taps do not necessarily have to be located exactly at the point of mean velocity. Tests have shown that extremely accurate correlation of mean velocities and highly desirable overall results are obtained regardless of changes in velocity profiles and flow rates. Various methods and means of averaging the pressures sensed, which are well known in the art, can be utilized in conjunction with a plurality of fins if even more accurate results are desired.

Figure 3:
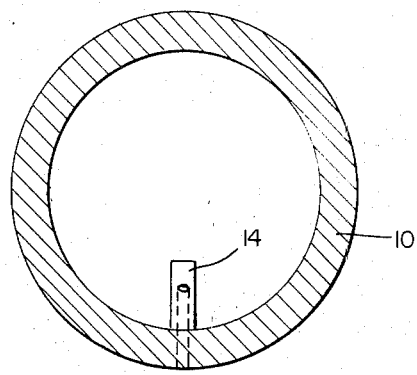
FIG. 3 is an end view of the device shown in FIG. 1.

The effective Beta ratio of the device having one or more fins such as that disclosed can be selected by simply changing the frontal area of the fin. For example, when viewed in FIG. 3 it is apparent that the inside diameter of the conduit can be used to calculate the cross-sectional area thereof. If, from this cross-sectional area, the total frontal area of the fin, as shown in FIG. 3, is subtracted, and then the quantity so obtained is divided by the cross-sectional area of the conduit, this will represent the "effective" Beta ratio. Thus, if the width or length aspect of the fin were changed so as to be made wider or narrower and/or higher or lower the "effective" Beta ratio would be changed accordingly. Therefore, for a given conduit diameter, it is possible to select a predetermined differential pressure output as a function of the effective Beta ratio. Stated another way, since the effective Beta ratio is a function of the frontal area of the fin (in accordance with my invention), it is therefore possible to select a fin which will produce an accurate, predetermined differential pressure output for a given pipe size and flowrate.

Since the fin is non-annular, it represents only a slight obstruction or restriction to fluid flow. Also it will measure a specific and exactly determined fraction of the total flow through the conduit.

Referring to FIG. 2, fin 12 in the orientation shown can utilize impact tap 22 (rather than 16) in conjunction with low pressure tap 18, if the flow is in normal direction. Also, if the flow is in normal direction static tap 20 (rather than taps 16 or 22) can be used in conjunction with low pressure tap 18. Also, if the direction of flow is reversed, tap 18 can be used as the positive high pressure sensor and either tap 16 or 22 can be used to sense the low pressure. In the reversed flow condition angle "A" can be increased or decreased to correspondingly change the differential produced and to vary the degree of rectification of velocity profiles desired.

Figure 4:
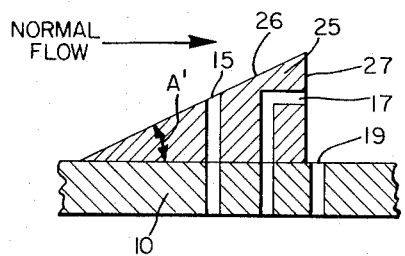
FIG. 4 is an elevational view of a fin similar to the fin shown in the prior figures illustrating an alternate embodiment of my invention.

When using a fin as shown in FIG. 4 to measure fluid and gas flow rates and to produce selected differential pressure outputs for these rates the low pressure tap can be located either in the fin or adjacent to it. Therein the fin 25 again has a triangular profile when viewed in a direction transverse to the direction of fluid flow. However, the hypotenuse 26 extends from the inner wall of the conduit downstream to its innermost end. Once again the vertical leg 27 of the triangular fin is substantially a rectangle as is the hypotenuse and both are planar. The triangular sides of the fin are smooth and parallel and extend axially and the edges are sharp so as to provide a shearing action on the fluid. Here the high pressure tap 15 is disposed in the forward facing sloping surface. The sloping surface has been proven by test to average the deviations in velocity profiles caused by upstream conditions so that it is no longer necessary with this device to be precisely accurate in locating the high pressure tap 15 at the theoretical standard point of mean velocity (although this, of course, is desirable). An increase or decrease in the angle A' causes corresponding changes in the high pressure output and resultant corresponding changes in the differential output. This device also has the added capabilities for varying effective Beta ratios by changing the width (or length aspect) and/or the height of the fin thereby changing the amount of frontal area of the fin causing more or less restriction in the conduit or ring, as described hereinbefore. The results which can be obtained by making one or more of these changes can be easily preselected. Further, as previously described, the uses of various combinations of high and low pressure taps can produce different results and functional principles, all of which, have been found by test to produce highly satisfactory and high predictable results. As emphasized the fin in non-streamlined and blunt and has sharp edges extending inwardly from the interior surface of the body facing into the axial flow to shear the media being measured and create a wake with a quiescent region in part bounded by said wake and said fin. The low pressure tap preferably communicates with the quiescent wake region. For example, it can be located in the vertical leg 27 as at 17, or through the wall of the conduit as at 19.

Figure 5:
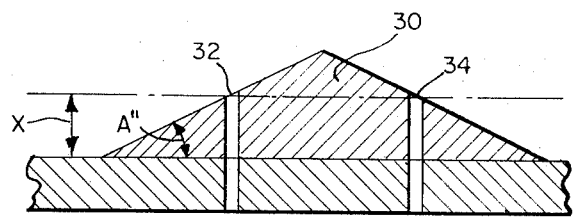
FIG. 5 is an elevational view of another fin illustrating another alternate embodiment of my invention.

Another fin configuration in accordance with this invention is shown in FIG. 5. Therein the fin 30 has the profile of an isosceles triangle when viewed in elevation transverse to the direction of fluid flow. Once again it is desirable to locate the high and low pressure taps 32 and 34 respectively at the same distance "X" radially inwardly from the inner wall of the conduit or ring section to obtain a very desirable correlation between high and low pressures sensed. These openings should preferably be located at the standard point of mean velocity. Of course, they do not necessarily have to be located at this point.

Taps located as shown, sense both high and low pressures in a dynamic manner as described with respect to FIG. 2, wherein the positive pressure sensed is velocity head plus static pressure and the low pressure not only is directly correlated with the high pressure, but, receives the benefits of lowered pressure and viscous drag forces and a momentum exchange from the main flow which produces a relatively higher velocity and a correspondingly lower suction pressure which results in a higher differential output for a given effective Beta ratio, conduit size and flow rate. The sloping surfaces are planar and are substantially rectangular. The corners and edges are sharp and the lateral faces are parallel to provide a shearing action. Here both high and low pressure taps open in the sloping surfaces. As with the device shown in FIG. 4, the lead angle A" can be changed to effect the Beta ratio and differential pressure.

With fins as shown in FIGS. 2, 4 and 5 it is possible to selectively predetermine the effective Beta ratio, the differential output and overall performance characteristics desired by selecting the configuration, its width and height, the angle of the hypotenuse and the proper combination of high and low pressure taps. Net head losses are, for all practical purposes, so negligible that sophisticated laboratory devices known can not measure them with any degree or accuracy. Further, all devices described herein function linearly to such low pipe Reynolds numbers that it is factual to state that this invention can accurately measure over flow ranges from approximately theoretical zero flow to approximately theoretically infinitely high pipe Reynolds numbers. In addition, the laying length of these inventions, if mounted in a conduit is, from a practical standpoint, almost zero and if the fins are mounted in a cylindrical ring which is installed between flanges of a conduit, the lengths of my invention are a mere fraction of the short "compact" type Venturis and this fraction becomes increasingly relatively smaller as the basic conduit size increases. For example: a typical 8 inch size "compact" Venturi is approximately 10 ½ inches long and an 8 inch device manufactured in accordance with my invention is 1 to 1 ¼ inches long. This fraction (approximately 10 percent) in the larger sizes is approximately 5 percent of the length of the larger sizes of Venturis. The manufacturing cost of my invention, depending on whether it is mounted in the conduit or in a separate ring is in the same order of magnitude. Further, none of the embodiments shown herein are affected by eddies and back flow or cavitation in the low pressure area of measurement which is inherent to some degree in all known Ventureis, orifice plates, flow tubes and flow nozzles.

It will be understood that various changes in the details, materials and arrangement of parts which have been herein described and illustrated in order to explain the nature of this invention, may be made by those skilled in the art within the principle and scope of the invention as expressed in the following claims.

It will further be understood that the "Abstract of the Disclosure" set forth above is intended to provide a non-legal technical statement of the contents of the disclosure in compliance with the Rules of Practice of the United States Patent Office, and is not intended to limit the scope of the invention described and claimed herein.

What is claimed is:

1. A differential pressure producing fluid flow device having high and low pressure sensing taps, for insertion into a conduit of a fluid system, comprising: at least one non-annular fin connected to and extending inwardly from the wall of said conduit; said fin having a generally triangular profile when viewed in elevation transverse to the direction of fluid flow with one side extending from the inner wall of said conduit in an upstream direction to the innermost end thereof; and said low pressure sensing tap opens in said side; said fin having a non-streamlined blunt shape with sharp edges extending inwardly from the interior surface of said conduit to face into the axial fluid flow to shear the fluid and create a centrifugal force and flow path in the localized area of, and communicating with, the low pressure sensing tap.

2. The invention of claim 1 wherein said side of said generally triangular profile is an hypotenuse.

3. The invention of claim 2 wherein said high pressure sensing tap opens in the inwardly extending upstream leg of said generally triangular profile of said fin; and said leg and said hypotenuse lie in substantially planar surfaces.

4. The invention of claim 1 wherein said high pressure sensing tap opens in the inwardly extending upstream of leg of said generally triangular profile of said fin.

5. The invention of claim 4 wherein said high pressure and low pressure sensing taps are positioned at the same distance radially inwardly from the wall of the conduit.

6. The invention of claim 1 wherein said generally triangular profile is substantially an oblique triangle wherein the included angle between the inwardly extending legs is obtuse.

7. The invention of claim 6 wherein said high pressure and low pressure sensing taps are positioned at the same distance radially inwardly from the wall of the conduit.

8. The invention of claim 1 wherein said side is a substantially planar surface.

* * * * *

UNITED STATES PATENT OFFICE
CERTIFICATE OF CORRECTION

Patent No. 3,683,693     Dated August 15, 1972

Inventor(s) William R. Brown

It is certified that error appears in the above-identified patent and that said Letters Patent are hereby corrected as shown below:

Column 3, line 23, that portion of the equation reading $\frac{D}{d}$ should read $\frac{d}{D}$ Signed and sealed this 2nd day of January 1973.

(SEAL)
Attest:

EDWARD M. FLETCHER, JR.
Attesting Officer

ROBERT GOTTSCHALK
Commissioner of Patents